United States Patent
Ainsworth et al.

(10) Patent No.: US 6,910,876 B2
(45) Date of Patent: Jun. 28, 2005

(54) MANDREL FOR FORMING A CURVED HOSE

(75) Inventors: Carol Lynn Ainsworth, Sun Prairie, WI (US); Robert John Kozak, Sun Prairie, WI (US)

(73) Assignee: The Goodyear Tire & Rubber Company, Akron, OH (US)

( * ) Notice: Subject to any disclaimer, the term of this patent is extended or adjusted under 35 U.S.C. 154(b) by 318 days.

(21) Appl. No.: 09/858,390

(22) Filed: May 16, 2001

(65) Prior Publication Data

US 2002/0171175 A1 Nov. 21, 2002

(51) Int. Cl.[7] .............................................. B29C 57/04
(52) U.S. Cl. ............. 425/393; 425/403; 425/DIG. 218; 249/177
(58) Field of Search ................. 425/392, 393, 425/403, 409, DIG. 218; 249/175, 177

(56) References Cited

U.S. PATENT DOCUMENTS

| 4,015,918 A | | 4/1977 | McPhee et al. ............. 425/403 |
| 4,080,141 A | * | 3/1978 | Usui ........................... 425/393 |
| 4,110,396 A | | 8/1978 | Reynolds .................... 264/236 |
| 4,118,162 A | | 10/1978 | Baumgarten ................ 425/113 |
| 4,242,296 A | | 12/1980 | Bricker ........................ 264/149 |
| 4,436,690 A | | 3/1984 | Davis ........................... 264/313 |
| 4,500,485 A | * | 2/1985 | Willemsen et al. .......... 425/393 |
| 5,176,866 A | | 1/1993 | Tanaka et al. ............... 264/219 |
| 5,433,902 A | | 7/1995 | Leyderman ................. 264/29.1 |

FOREIGN PATENT DOCUMENTS

| JP | 63-270121 | * | 8/1988 | |
| JP | 3275339 | | 12/1991 | ........... B29D/23/22 |
| JP | 5301298 | | 11/1993 | ........... B29D/23/18 |
| NL | 9302251 | | 7/1995 | ........... B29C/35/00 |
| SD | 1331660 | | 8/1987 | ........... B29D/23/22 |
| SD | 1421540 | | 9/1988 | ........... B29C/53/08 |

* cited by examiner

Primary Examiner—Benjamin L. Utech
Assistant Examiner—Thu Khanh T. Nguyen
(74) Attorney, Agent, or Firm—Nancy T. Krawczyk; Richard B. O'Planick

(57) ABSTRACT

A method of forming a curved hose and a mandrel for forming a curved hose is disclosed. A hose length is inserted onto a multi-legged mandrel to form a curved hose. The mandrel has at least two legs and the opposing ends of the hose are placed on the mandrel legs such that a portion of the hose is unsupported by an internal mandrel. The unsupported portion of the hose may be straight or may be looped to form a more complexly curved hose. The unsupported portion of the hose may also be held in position by an external mandrel.

6 Claims, 5 Drawing Sheets

MANDREL FOR FORMING A CURVED HOSE

FIELD OF THE INVENTION

The present invention is directed to a method of forming a hose and a mandrel for forming a hose. More specifically, the invention is a method for forming curved hose and a multi-legged mandrel upon which the hose is formed.

BACKGROUND OF THE INVENTION

Curved hose is typically manufactured by positioning a pre-cut length of hose carcass over a curved mandrel and then heating and curing the carcass to define a curved hose. A conventional mandrel 100 is illustrated in FIG. 1. The mandrel 100 typically has a collar 102 at one end to attach the mandrel 100 to a curing rack.

To form a curved hose, the mandrel 100 has a configuration either identical or overbent in comparison to the desired final configuration of the hose. The curved hose, and thus the mandrel 100, may have both straight 104 and curved 106 portions. Because of the combination of both straight 104 and curved 106 sections and the complexity of the required hose curvatures, insertion and removal of the hose onto and from the mandrel may result in damage to either the hose or the mandrel 100 because of the force required to insert or pull the hose onto or off of the mandrel 100.

To assist in insertion of the hose carcass onto the mandrel and removal of the cured hose from the mandrel, lubricants may be applied to either the mandrel or the inner surface of the hose. Other proposed solutions include forming the mandrel from a memory metal that straightens out to permit easy installation and removal of the hose length. Another mandrel solution is by forming the mandrel from a plurality of sections threaded unto a rod which can then be taken apart following curing to release the curved hose.

However, even with all of these solutions, damage to the hose or the mandrel may still occur. Additionally, when the hose is removed following cure, straight portions of the cured hose must still be pulled over a curved section of the mandrel and curved portions of the cured hose must still be pulled over straight sections of the mandrel. Pulling the hose through different configurations in this manner can affect the final configuration of the hose.

SUMMARY OF THE INVENTION

The present invention is directed to a method of forming a curved hose and the mandrel upon which the curved hose is cured. The hose has at least one layer of vulcanizable material.

In one disclosed method of curing the hose, the curing method includes the steps of inserting the hose length onto the mandrel and curing the hose. The mandrel has a pair of extending legs wherein at least one of the mandrel legs has a curved portion. The specific configurations of each leg is dependent upon the final hose specifications. The hose is inserted onto the mandrel by inserting a first hose end onto one mandrel leg and then inserting a second hose end onto the second mandrel leg.

In another disclosed method, prior to inserting the hose length onto the mandrel, partially curing the hose length. The precuring of the hose should be sufficient to ensure that the material forming the hose maintains its inside diameter during curing on the mandrel. If the hose is formed of multiple layers, than any precuring should be sufficient to also promote adhesion between the multiple layers of the hose.

In another disclosed method, prior to securing the second opposing end of the hose onto the second mandrel leg, the hose length may be twisted to form a loop in the hose length. Alternatively, the central portion of the hose, that portion unsupported by any internal mandrel, may be held taunt between the mandrel legs.

In another disclosed method, the central portion of the hose unsupported by any internal mandrel may be placed in an external mandrel to shape the hose.

Also disclosed is the mandrel to form the curved hose. The mandrel has a pair of opposing legs wherein at least one of the mandrel legs has a curved portion.

In another disclosed mandrel, the both mandrel legs have a curved portion.

In anther disclosed mandrel, the mandrel has a hollow tube located between the ends of the mandrel legs. The hollow tube is an external mandrel into which the hose is placed to shape or support the central portion of the hose which is not supported by an internal mandrel.

The mandrel may be formed from a base rod onto which the opposing legs are secured. The legs may be fixed secured to the base rod or may be mounted onto the rod in an adjustable manner in order to vary the location of the legs relative to each other.

BRIEF DESCRIPTION OF THE DRAWINGS

The invention will be described by way of example and with reference to the accompanying drawings in which.

DETAILED DESCRIPTION OF THE INVENTION

Figure 1:
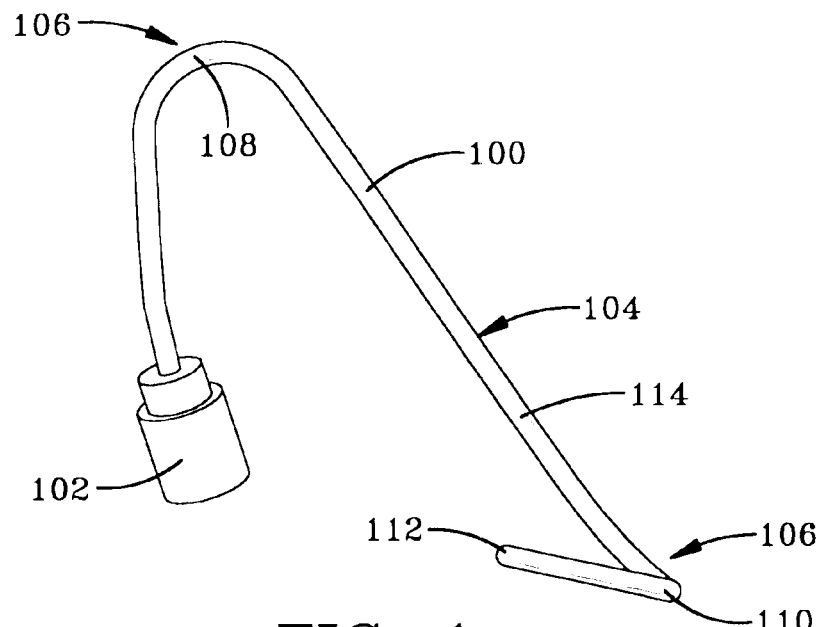
FIG. 1 illustrates a conventional curved mandrel for forming a curved hose with a central straight portion.

FIG. 1 illustrates a conventional hose mandrel 100, as previously discussed. The mandrel 100 has a two curve configuration, with a first curve 108 located at a point closest to the attachment collar 102 and a second curve 110 located distally from the attachment collar 102 and close to the end 112 of the mandrel 100. The section 114 between the two curves is illustrated as straight, but this portion may also be curved. Depending upon the specifications for the finished hose, this central portion 114 may be configured as a loop, which vastly increases the complexity in inserting and removing a hose onto and off of the mandrel 100. Mandrels for cut hose lengths can have a variety of configurations and are not limited to the sole example provided here. The specific configuration for a curved hose, and thus the mandrel upon which the hose is formed, is dependent upon the final use of the hose and the setting into which the hose is to be installed.

Figure 2:
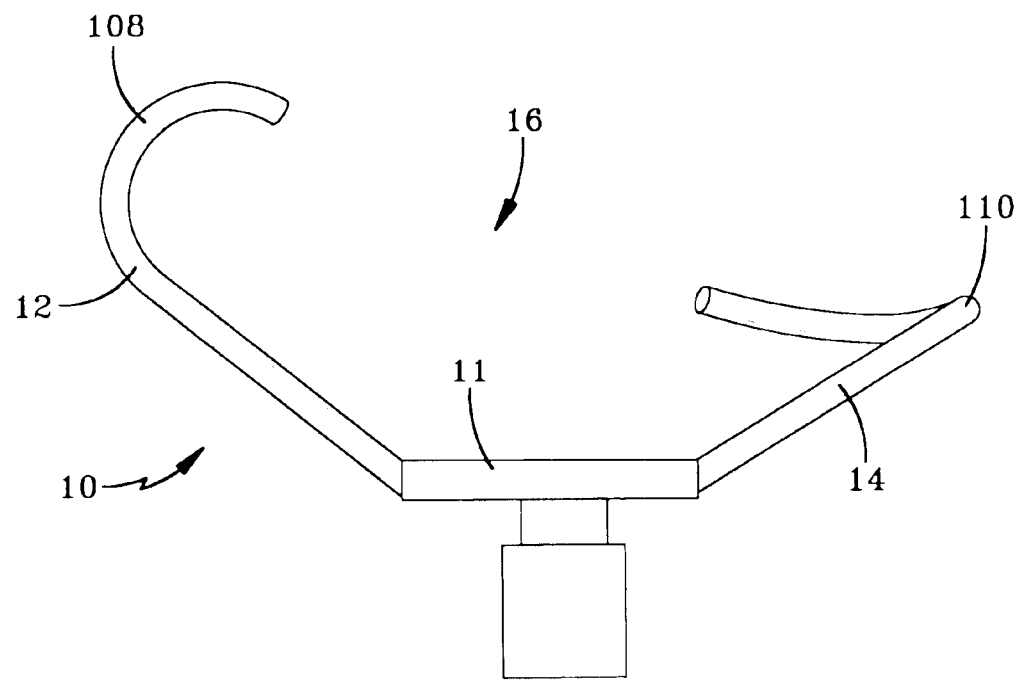
FIG. 2 illustrates a multi-legged mandrel formed in accordance with the present invention.

One embodiment of a mandrel 10 in accordance with the present invention is illustrated in FIG. 2. Instead of being a single shaped rod as with the conventional mandrel 100, the mandrel 10 has a base 11 upon which are two opposing legs 12, 14. The mandrel 10 replaces the conventional mandrel 100, with the conventional mandrel 100 being split at a convenient midpoint and a gap 16 being left between the ends of the resulting legs 12, 14. The first leg 12 of the mandrel 10 has the same first curve 108 as in the conventional mandrel 100 and the second curve 110 of the conventional mandrel 100 is present in the second mandrel leg 14.

Figure 3:
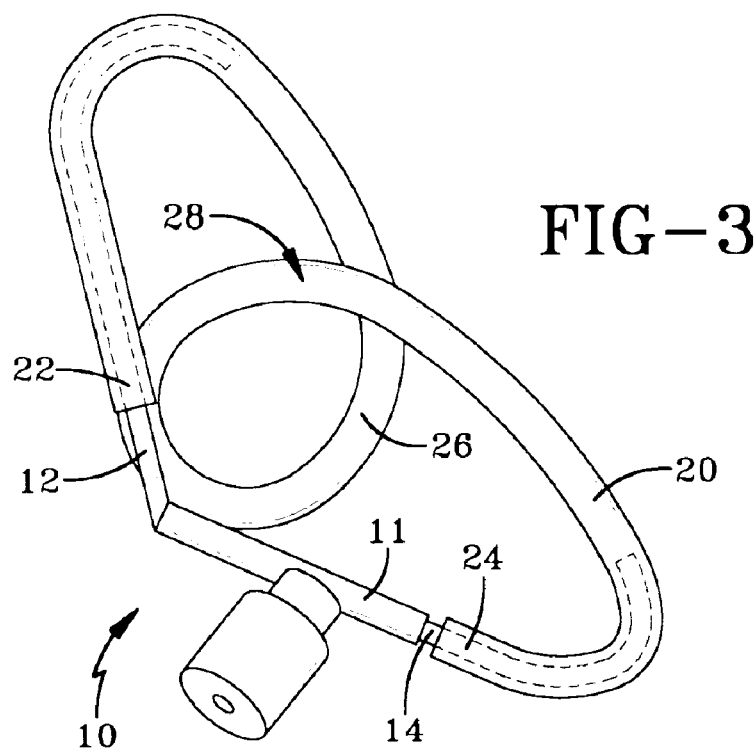
FIG. 3 is a hose on the multi-legged mandrel.
Figure 4:
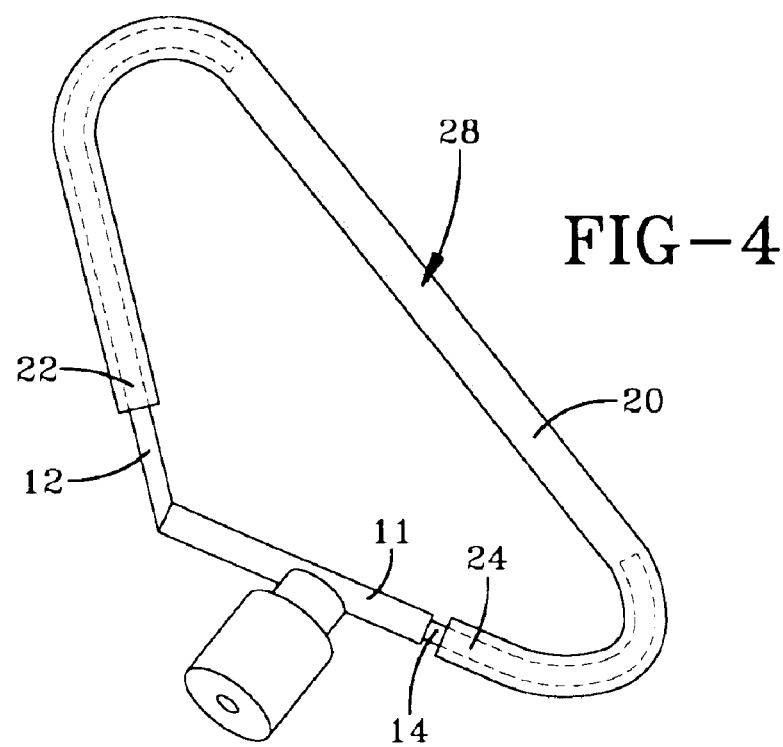
FIG. 4 is another embodiment of a hose on the multi-legged mandrel of FIG. 2.

A cut length of a hose 20 is inserted onto each leg 12, 14 of the mandrel 10, see FIGS. 3 and 4. In one embodiment of the hose, the hose has an inner layer, a reinforcement layer, and an outer layer. The inner and outer layers may be formed from any of various types of vulcanizable material, including, but not limited to, natural and synthetic rubbers, such as styrene-butadiene rubber, neoprene, butyl rubber, ethylene-propylene-diene terpolymers, urethanes, and the like. The inner and outer layers may also be formed from thermoplastic materials, including but not limited to, any nylons or fluorinated plastics. The reinforcement layer may be in the form of braid, spiral, or knit reinforcement of cotton, rayon, polyester, polyaramide, or any combination of these materials. In some embodiments, there may be no reinforcing layer as such a layer may not be required by the intended application of the hose. Other embodiments of the hose include hoses with more or less vulcanizable layers and multiple reinforcement layers. In another embodiment, the hose length may be a single layer of vulcanizable or curable material; again, the particular hose construction is dictated by the intended application of the hose. For manufacturing efficiency, the hose may be formed first as a continuous length hose and then cut into the hose lengths 20 at some point in manufacturing prior to placing the hose length 20 onto the legged mandrel 10.

The hose length 20 has two opposing ends 22, 24. To mold the hose length 20 into a curved hose length, one end 22 of the hose length 20 is inserted onto the first mandrel leg 12. The second opposing end 24 of the hose length 20 is inserted onto the second mandrel leg 14. In the embodiment shown in FIG. 3, prior to inserting the second hose length end 24 onto the mandrel 10, the hose length 20 is twisted to form a loop 26 in the midsection 28 of the hose length 20. In the embodiment of FIG. 4, the midsection 28 of the hose length 20 is held straight between the ends of the mandrel legs. In both embodiments, the hose length 20 is held taunt between the free ends of the mandrel legs 12, 14. Because only the ends of the hose length 20 are inserted only the mandrel legs 12, 14, the midsection 28 of the hose length 20 is unsupported by an internal mandrel during curing.

Prior to insertion upon the mandrel 10, the hose length 20 may be either partially cured or uncured. The determination of partially curing the hose length 20 prior to shaping on the split mandrel 10 is based primarily upon the characteristics of the hose length 20, the configuration the hose length 20 is to assume during curing, and the amount of unsupported hose length 20 during curing.

Because a section of the hose length 20 is unsupported during curing, prior to inserting the hose length onto the mandrel, the various layers forming the hose length 20 should be sufficiently adhered to one another, or should be able to sufficiently adhere to one another without internal support, to ensure complete adhesion of the layers during curing of the hose on the mandrel. The hose length 20 must also be able to maintain its internal diameter along the unsupported length during curing.

Examples of a hose length 20 suitable for placing onto the split mandrel 10 in an uncured condition include, but are not limited to, a hose formed of a single layer of curable material that is stable enough after forming the hose to maintain its internal diameter or a hose length 20 formed of relatively tacky layers that readily adhere to each other during forming of the hose length 20.

If the various layers of the hose length 20 do not readily adhere to each other, in order to ensure adhesion of the layers or maintain stability of the internal diameter of the portion of the unsupported hose, the hose length 20 may be partially cured prior to placement of the hose length on the mandrel. The hose is cured to a point sufficient to ensure adhesion between the various layers of the hose or to maintain stability of the inside diameter of portion of the unsupported hose. Depending on the type of material forming the hose, this can range from about a 10% precure to about a 90% precure. For an all rubber hose, the precure amount can be as little as a 10% precure, while for hoses comprising thermoplastic or fluorinated plastic layers, the precure amount can be as great as 90%. Precuring can be achieved either after a continuous hose length is cut into the shorter length hose sections or after cutting into hose sections. For ease of manufacturing, when precuring is desired, it is preferable to precure a continuous hose length before cutting into the required hose lengths.

After the hose length 20 is inserted onto the mandrel 10, the mandrel 10 is placed in an autoclave, an open air oven, or other conventional curing means to cure the hose length 20. Following curing, the hose length 20 is removed from the mandrel 10. The hose 20 is removed from the mandrel 10 by first removing a first hose end 22 from a first leg 12 and then removing the second hose end 24 from the remaining mandrel leg 14. Because each curved portion of the cured hose must only be pulled through a short section of the mandrel 10, there is a significant reduction in any alteration in the curvature imparted to the hose length 20 during curing.

Figure 5:
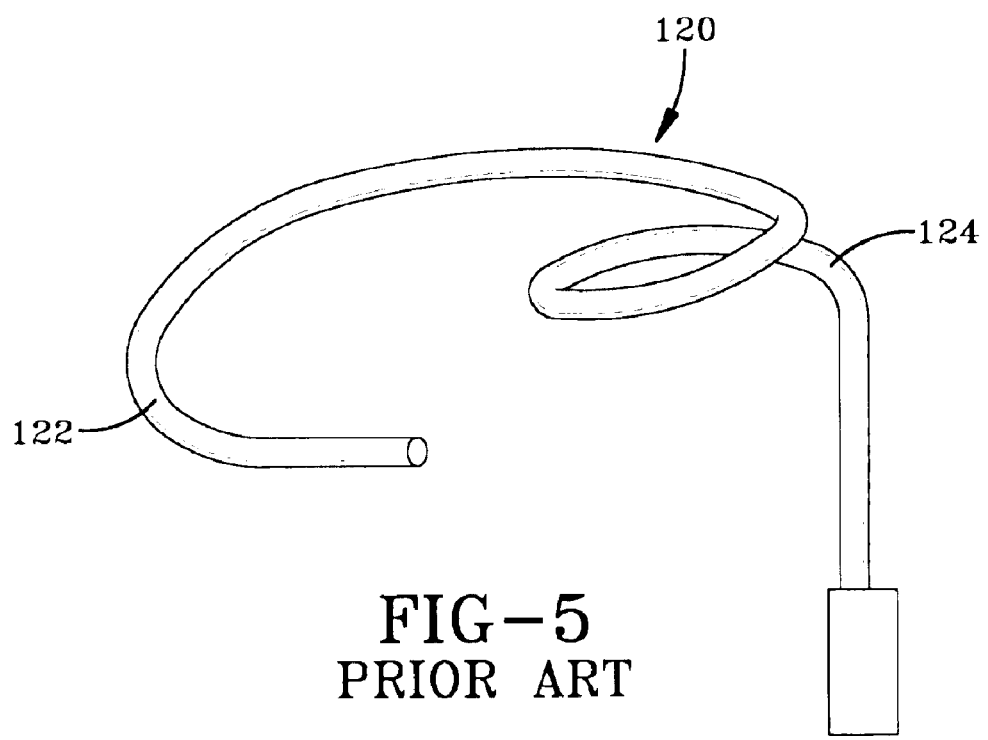
FIG. 5 illustrates another embodiment of the multi-legged mandrel.
Figure 6:
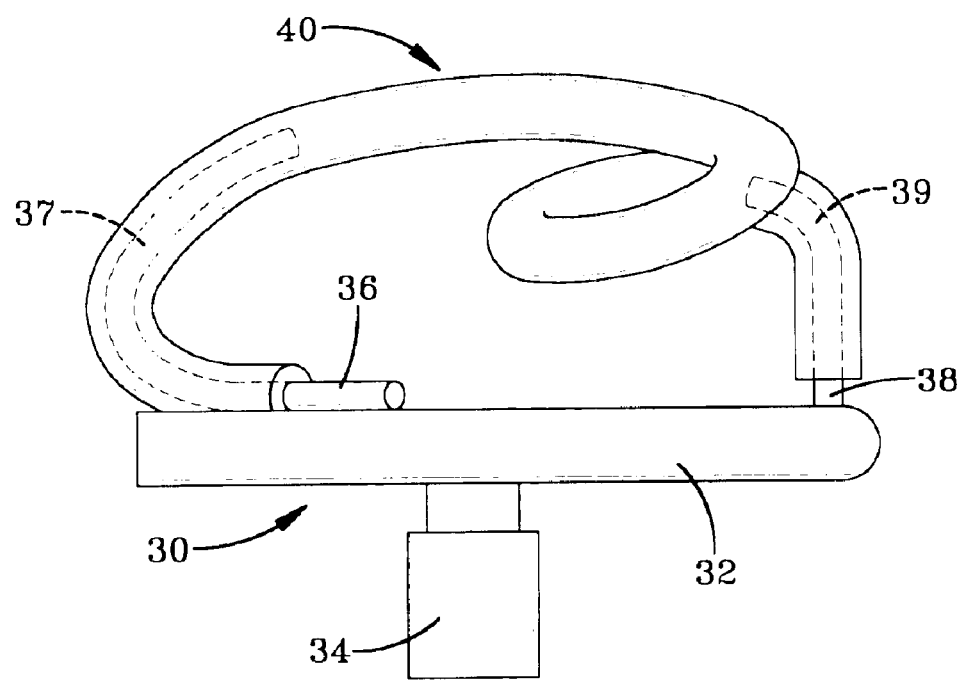
FIG. 6 is a hose on the mandrel of FIG. 5.
Figure 7:
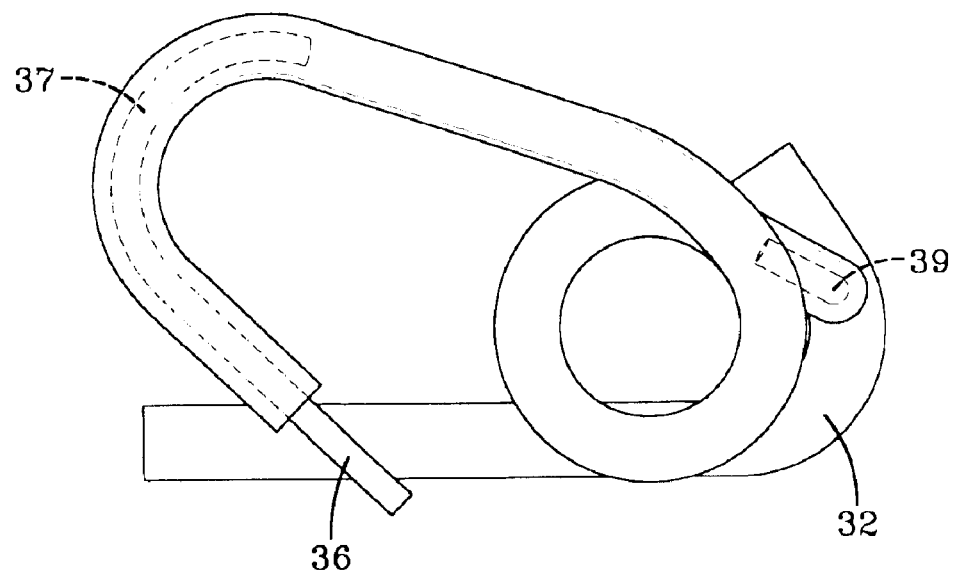
FIG. 7 illustrates another embodiment of the multi-legged mandrel.

FIG. 5 shows another prior art mandrel 120, and FIGS. 6 and 7 show another embodiment of a mandrel 30 in accordance with the present invention that replaces the prior art mandrel 120. The mandrel 30 has a supporting base 32 fixed to the attachment collar 34. A first extending leg 36 and second extending leg 38 are mounted on the base 32. Each leg 36, 38 has a curve 37, 39 imitating a curve 122, 124 of the prior art mandrel. FIG. The center section of the hose length 40 has been looped to form a highly curved molded hose. Again, depending on the hose specifications needed, the center section of the hose length 40 may be held taunt.

For any mandrel formed in accordance with the invention, the gap left between the ends of the resulting legs may have a varying length. The length of the gap is dependant upon the desired curvature of the final hose. For the preceding exemplary two mandrels 10, 30, the gap length may be varied. If no looping of the hose length is required, the legs may be longer and the gap shorter. However, the gap must still be sufficient to prevent any negative effects of pulling the cured curved portion of the hose over a straight mandrel.

Figure 8:
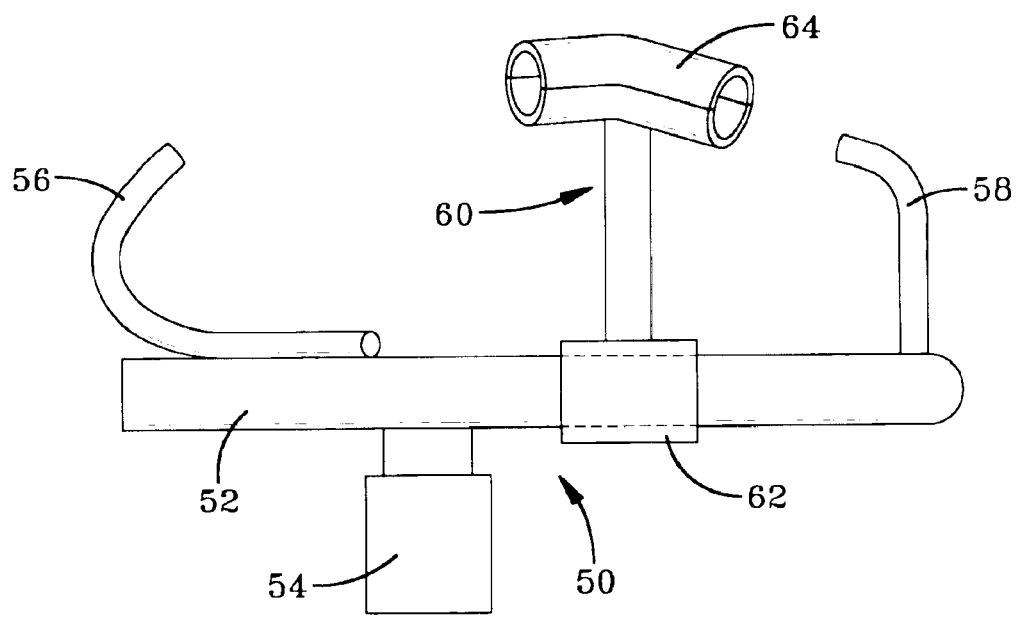
FIG. 8 illustrates a hose on another embodiment of the multi-legged mandrel used in conjunction with an external mandrel.

The present invention may be used to form any type of curved hose by employing a multi-leg mandrel, the mandrel leg configurations is dependent upon the desired hose specifications, and if needed, only one of the mandrel legs may have a curved portion. The center portion of the hose may be straight, as seen in FIG. 4, or looped, as seen in FIG. 3, 6, or 7. It may be desired that a portion of the hose between curves be provided with an additional bend or curve. To reduce the mandrel length and the pulling of the hose through an additional curved section, an external mandrel may be used to form a third curve in the hose. Such a mandrel is shown in FIG. 8.

The mandrel 50 is similar to the mandrel 30 as seen in FIGS. 6 and 7. Also mounted onto the base 52 is an external bend mandrel 60. The bend mandrel 60 is attached to the base 52 by means of a collar 62. The mandrel 60 may be fixedly attached to the base 52 or it may be mounted such that the external bend mandrel 60 may be rotated out of the way if so needed. To ensure proper placement of the mandrel 60, and thus proper location of the bend in the finished hose, the collar 62 and the related base 52 may be provided with placement means such as groove and tongue, ball and socket, or other conventional placement means.

Figure 9:
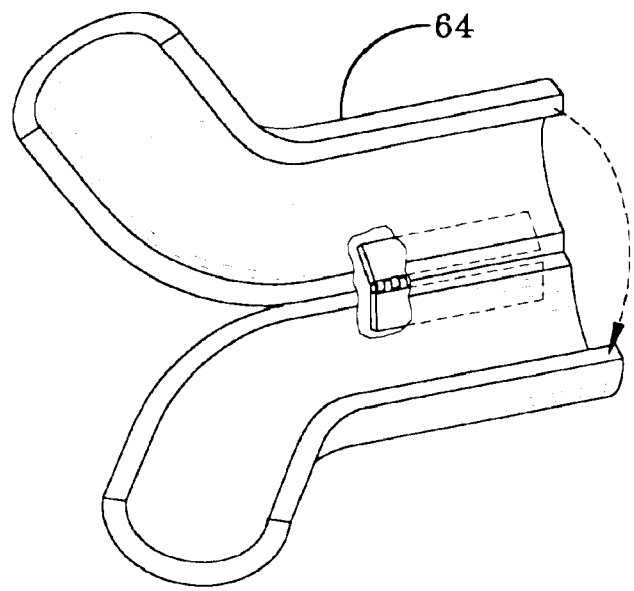
FIG. 9 is the external mandrel tube.

The upper portion of the external mandrel 60 has a bent tubular configuration. The tube 64 is a hollow tube that is split and hinged together, see FIG. 9. The configuration of the bend tube 64, similar to the configurations of the curves in each leg 56, 58, is selected according to the required specifications of the final hose.

When a hose is inserted onto the mandrel 50, the tube 64 is in an open position. A first hose end is put onto a first leg 56, the central segment of the hose is then inserted into the tube 64 and the tube 64 is closed, and then the second hose end is secured onto the second leg 58. The hose is then cured.

While all of the illustrated mandrels are shown as unitary pieces, excluding the external mandrel 60, a mandrel in accordance with the invention may be formed in a piecemeal fashion so that the mandrel configuration can be quickly and inexpensively changed in order to meet changed or new hose specifications. Using the mandrel 10 as an example, the mandrel 10 may be formed in a piecemeal fashion by forming the mandrel base 11 from a threaded rod. At least one end of the rod is threaded, with the threads extending a substantial distance along the length of the rod. The leg 12 or 14 to be mounted at the threaded end is secured to a threaded nut and then the leg 12 or 14 is threaded onto the rod to the desired position and locked into place with a locking nut. The remaining leg 14 or 12 may likewise be secured to the other end of the rod if both ends of the rod are threaded, or the leg 14 or 12 may be fixedly secured to the other end of the rod by means such as welding or other known securing techniques. The distance between the legs may be quickly changed, by varying the distance upon which the leg 12 or 14 is threaded onto the rod, to form a new configuration or one or both legs 12, 14 may be quickly replaced with a leg of a new configurations to achieve a new hose configuration.

Those skilled in the art will readily appreciate that the inventive concept as disclosed is not limited to the illustrated mandrels but may be used for any type of curved, looped, or bent hose configurations. The specific construction of any mandrel in accordance with the invention is dependant upon the final required hose specifications.

What is claimed is:

1. A mandrel for forming a hose, the mandrel being characterized by a pair of opposed legs having first free ends configured for location within opposite respective ends of a hose to shape the ends from an original external geometrical configuration into an altered external geometrical configuration, and wherein at least one of the mandrel legs has a curved portion and wherein the mandrel is further comprised of a base rod having opposite rod ends to which the opposing legs are secured at opposite leg ends, and at least one opposite end of the legs is threaded to one said rod end such that the one leg independently adjusts a separation distance between the one leg and the opposite leg and the one leg independently laterally rotates about the one rod end to adjust a rotational position of the one leg relative to the opposite leg.

2. A mandrel in accordance with claim 1 wherein both legs are threaded onto the base rod such that each leg independently adjusts a separation distance between the legs and each leg independently adjusts a rotational position of the leg relative to the opposite leg.

3. A mandrel for forming a hose, the mandrel being characterized by a pair of opposed hose-shaping legs having first free ends configured for receipt within opposite respective ends of a hose, and further comprised of a connective member connecting second ends of the opposing legs and including adjustment means for altering laterally the angular relationship and separation distance of at least one opposing leg relative to the opposite opposing leg and wherein the connective member comprises an elongate bar extending between and supported by the second ends of the opposing legs.

4. A mandrel for forming a hose, the mandrel being characterized by a pair of opposed hose-shaping legs having first free ends configured for receipt within opposite respective ends of a hose, and further comprised of a connective member connecting second ends of the opposing legs and including adjustment means for altering the separation distance and lateral rotational relationship between at least one opposing leg and the opposite opposing leg and wherein the adjustment means comprises a threaded connection between at least one leg second end and a connective member end allowing the at least one leg second end to rotate about the connective member end.

5. A mandrel according to claim 4, wherein a threaded connection attaches the second ends of both legs to the connective member whereby each leg independently adjusts the separation distance and rotational relationship between the opposed legs.

6. A mandrel according to claim 4, wherein the one opposing leg is rotationally adjustable laterally relative to the opposing leg substantially three hundred and sixty degrees.

* * * * *